Sept. 13, 1955  A. SCHWEMMER ET AL  2,717,955
RECESSED LIGHTING FIXTURE
Filed June 18, 1953

INVENTORS
ALBERT SCHWEMMER
WILLIAM K. McGINTY
RUDOLPH A. BUSHCOTT
BY Wheeler, Wheeler & Wheeler
ATTORNEYS

United States Patent Office 2,717,955
Patented Sept. 13, 1955

2,717,955

RECESSED LIGHTING FIXTURE

Albert Schwemmer and William K. McGinty, Fort Atkinson, and Rudolph A. Bushcott, Milton, Wis., assignors to Thomas Industries Inc., a corporation of Delaware Application June 18, 1953, Serial No. 362,500

7 Claims. (Cl. 240—78)

This invention relates to a recessed lighting fixture.

Lighting fixtures, arranged to be recessed into a wall or the like, must be designed to meet the problems of heat and of access to the wiring. The fixture itself comprises a box or housing with removable cover and glass, as to which there is no particular heat problem. However, the housing is raised to a relatively high temperature by the lamp confined therein, and it is desirable to protect the junction box and wiring connections from full exposure to that heat. At the same time, it is desirable to make the junction box and wiring connections accessible through the opening in the housing afforded by the removal of its cover plate and glass.

In the past, the problem of heat has been met at some sacrifice of convenience of accessibility to the wiring. The present device mounts the junction box on the fixture housing to be handled unitarily therewith and yet the arrangement is such that when it becomes necessary to inspect or re-wire, the entire junction box may be drawn through the fixture housing, without even disconnecting it from the lamp socket, to fully expose its cover plate and wiring. To this end, the lamp housing has an opening large enough to permit the junction box to be passed through it. This opening is normally covered by a closure plate constituting a detachable wall portion of the fixture housing and to which the lamp socket and junction box are physically connected as a unitary sub-assembly which is fully wired.

The base of the lamp is inherently its coolest part. In the device disclosed, both the lamp base and the socket intervene between the lamp filament and the junction box to intercept and deflect radiated heat. The only physical connection of the junction box to the housing is effected through a piece of conduit attached at its ends to the junction box and the mounting plate aforesaid and through which the wiring passes to the socket. Since this length of conduit is wholly sealed by the socket from direct heat radiation, it does not tend to heat readily and its length and the numerous joints intervening between the housing and junction box protect against substantial heat conduction to the box. In consequence, the junction box remains effectively cool in use.

Unlike other devices attempting to meet these problems, no special design of junction box is required, as the construction hereinafter disclosed permits the entire junction box to be drawn into and even through the lamp housing to a position where every portion thereof is accessible.

Figure 1:
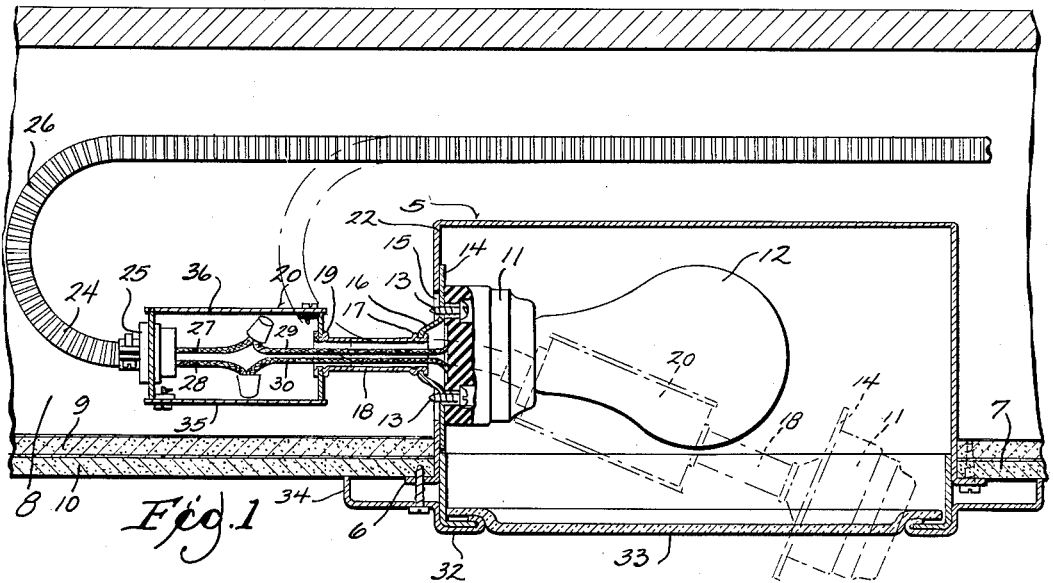
Fig. 1 is a view in longitudinal section through a fixture and junction box assembly embodying the invention.

The housing 5 is simply a metal box having marginal flange means at 6 apertured to receive mounting screws for connecting it with ceiling 7 or other wall, it being contemplated for the purposes of the present disclosure that a ceiling may be included with the generic term "wall."

As disclosed, the wall 7 comprises spaced joists, one of which is shown at 8, to which lath 9 and plaster 10 have been applied in the usual way. The housing 5 is received into the inter-joist space in the manner which is customary in the use of such fixtures.

Figure 3:
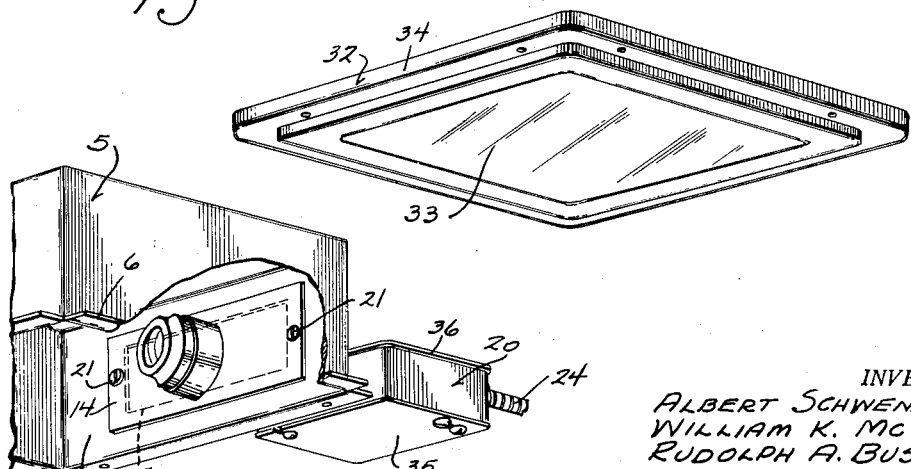
Fig. 3 is a fragmentary detailed view in perspective showing the mounting of the sub-assembly in the interior of the housing.

A unique feature of the present fixture consists in the wired sub-assembly of the lamp socket, junction box, conduit, and mounting plate. The lamp socket 11, in which the lamp 12 is screwed in the usual way, is connected by screws 13 to a mounting plate 14 which closes a rather large hole 15 in one end of housing 5. A portion of such plate immediately behind the socket is deformed rearwardly at 16 and engaged by the upset portion 17 of a length of conduit at 18, the outer end of which is upset at 19 in engagement with an end wall of junction box 20. The conduit tube 18 thus serves to provide a physical connection of the junction box with the same plate 14 on which lamp socket 11 is mounted, and upon which both the socket and conduit are dependent for support. As best shown in Fig. 3, the mounting plate 14 is desirably connected by only two screws 21 with the end wall 22 of the fixture housing 5.

The so-called BX cable 24 is fastened by means of the usual connector 25 to the junction box, which it desirably approaches from the opposite side of the fixture housing 5, to leave plenty of slack in the curved portion 26 of the BX cable. The wires 27, 28 which traverse the cable 24 have their free ends connected within the junction box with wires 29, 30 respectively, which pass through the tube 18 and are permanently wired to the socket 11. The tube 18 not only supports the junction box but provides a conduit within which wires 29 and 30 are enclosed.

Any desired finishing plate or bezel 32 with a transparent insert of glass or plastic at 33 may be used as a closure for the housing 5, the flange portion 34 thereof being extended to cover the flanges 6 which mount housing 5 to the wall.

Figure 2:
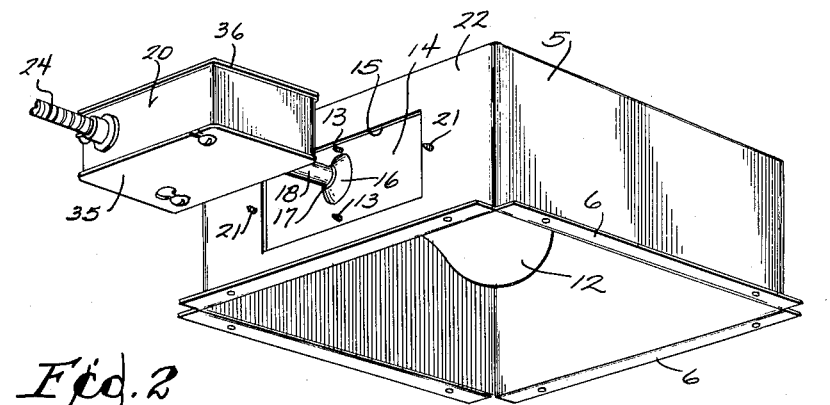
Fig. 2 is a view showing on a somewhat reduced scale perspective views of the fixture assembly and its cover in mutually separated positions.

When inspection or re-wiring is desired, the closure 32 is removed, as shown in Fig. 2, thus exposing the lamp 12 and the screws 21 which connect the mounting plate 14 of the sub-assembly to the end wall of housing 5. When screws 21 are withdrawn, the sub-assembly is free and may be grasped and pulled into and through the housing 5. The opening 15 in the end wall of the housing is sufficiently large to permit conduit 18 and the junction box 20 to pass bodily through the opening, such movement being accommodated by the slack provided at 26 in the BX power supply cable. After the junction box has passed through the opening 15 to and beyond the position shown in dotted lines in Fig. 1, it is fully exposed and, if the length of the slack in the cable permits, it may be even pulled completely out of the wall. In any event, it may readily be turned from side to side and inspected and regardless of the position of its closure plate (shown at 35 in Figs. 1 and 2 and at 36 in Fig. 1), the plate or plates are freely accessible and may be removed for complete access to the wiring connections within the box.

By converse manipulation of the parts, the sub-assembly is remounted with equal facility in the position shown in Fig. 1, whereupon the lamp 12 may be replaced and the closure 32 reapplied to the housing.

We claim:

1. A lighting fixture of the wall-recessed type comprising a housing having an opening, a panel normally closing said opening and removable to expose said opening, means detachably connecting said panel with said housing, lamp socket means mounted on said panel to be movable unitarily therewith and disposed within the housing, a junction box disposed externally of the housing opposite said opening and provided with means unitarily connecting it to said panel for support therefrom and unitary movement therewith, said junction box having a removable closure, and wiring from said junction box to said socket and including connections within said junction box adapted to be exposed within said housing when said panel and socket and junction box are unitarily moved into the housing, the said housing opening normally closed by the panel being of sufficient dimension to pass the junction box to expose its closure upon the occasion of such movement.

2. The device of claim 1 in which the said socket means comprises a socket having a lamp-receiving cavity directed away from said panel and a base intervening between said cavity and panel, the said junction box support means comprising a wiring conduit, said conduit and junction box being substantially aligned behind said base to be shielded by the base and said panel from heat developed by a lamp in the socket.

3. In a lighting fixture of the type adapted to be recessed in a wall, the combination with a housing having a removable cover plate and provided with a wall having an aperture, of a unitary sub-assembly comprising support means spanning the aperture, socket means mounted on the support means and normally disposed within the housing, a support bracket mounted on the support means and normally extending externally of the housing, a junction box carried by said bracket and supported thereby from said support means, together with fasteners accessible in the interior of the housing upon removal of said cover plate and removably fastening said support means to the housing, the said subassembly being unitarily manipulatable upon the release of said fasteners and the said opening being of sufficient size to pass said junction box, the said junction box having its own closure freely accessible when said junction box is manipulated into said housing through said opening.

4. The device of claim 3 in which said support bracket comprises a conduit, said junction box and conduit containing wiring connections to said socket, the said socket conduit and junction box being in substantial alignment for the protection of the junction box and said connections from radiated heat.

5. In a fixture of the character described to be mounted in a limited space between structural members in a wall or ceiling, the combination with a housing having a transparent front, a closed back and side wall portions, said housing having a side opening and a removable panel closure for said opening, of a junction box disposed laterally of the housing to lie between said structural members and a bracket mounting said junction box on the panel in a normal position outside the housing and spaced from the panel, the housing opening being of sufficient size to pass the junction box therethrough when the junction box is drawn through said opening upon the removal of the panel from the housing opening.

6. The device of claim 5 in which the housing is provided with a lamp socket therewithin and wiring extending from the lamp socket to the junction box.

7. The device of claim 6 in which the lamp socket is provided with means mounting it on the panel and a conduit from said socket to said junction box for the wiring.

References Cited in the file of this patent

UNITED STATES PATENTS

| | | |
|---|---|---|
| 1,799,304 | Logan | Apr. 7, 1931 |
| 2,561,986 | Jones | July 24, 1951 |
| 2,602,881 | Pryne | July 8, 1952 |